United States Patent [19]

Haney et al.

[11] 4,003,607
[45] Jan. 18, 1977

[54] FAILURE WARNING AND SHUT-OFF FOR ANTI-SKID SYSTEM

[75] Inventors: James R. Haney, Uniontown; Edgar J. Ruof, Akron, both of Ohio

[73] Assignee: Goodyear Aerospace Corporation, Akron, Ohio

[22] Filed: Mar. 24, 1976

[21] Appl. No.: 669,944

[52] U.S. Cl. ............................................. 303/92
[51] Int. Cl.² ........................................ B60T 8/00
[58] Field of Search ............ 303/92, 103, 105, 106, 303/111

[56] References Cited
UNITED STATES PATENTS

| | | | |
|---|---|---|---|
| 3,820,857 | 6/1974 | Schnaibel | 303/92 |
| 3,861,760 | 1/1975 | Hamelin | 303/92 |
| 3,883,184 | 5/1975 | Jonner | 303/92 |
| 3,920,284 | 11/1975 | Lane | 303/92 |

*Primary Examiner*—George E. A. Halvosa
*Assistant Examiner*—Reinhard J. Eisenzopf
*Attorney, Agent, or Firm*—J. G. Pere; P. E. Milliken; E. W. Oldham

[57] ABSTRACT

An improvement is provided for use in a wheeled vehicle having anti-skid circuitry associated with the wheels thereof. Fundamentally, the invention comprises a comparator connected to the anti-skid circuitry which produces an output signal when anti-skid signals exceed a particular level for a predetermined period of time. The output of the comparator is operative for removing the application of the anti-skid control circuit from the anti-skid valves and for applying in its place a rudimentary anti-skid control circuit comprising a multivibrator of predetermined duty cycle. Thus, under all conditions, braking effort remains with the vehicle operator but under certain conditions is modulated at a predetermined rate by the multivibrator. Provisions are also made for returning the anti-skid system to normal operation in conjunction with the brake system when the output of the anti-skid system drops below the aforesaid particular level.

12 Claims, 1 Drawing Figure

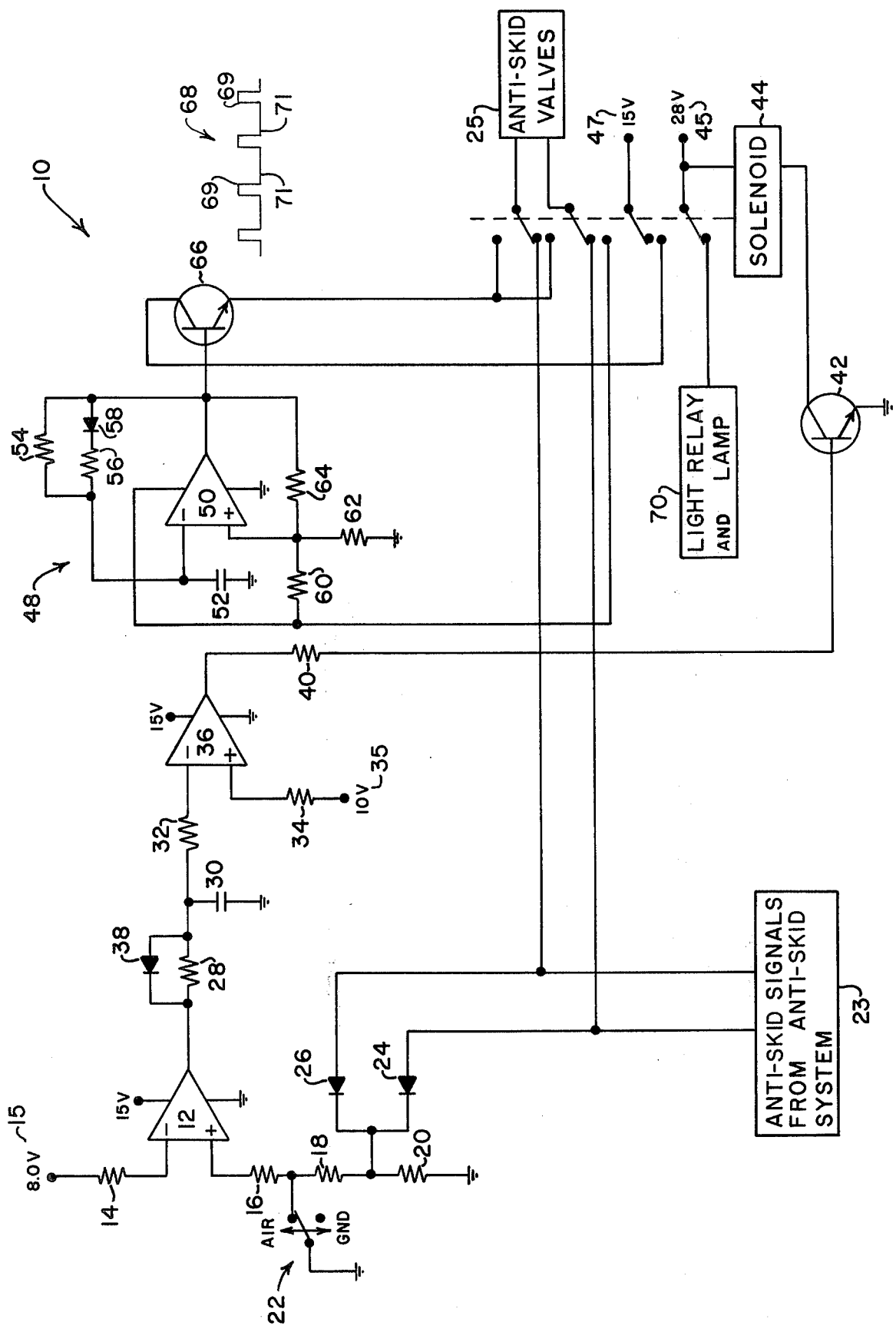

FAILURE WARNING AND SHUT-OFF FOR ANTI-SKID SYSTEM

BACKGROUND OF THE INVENTION

Heretofore numerous types of anti-skid devices have been known in the aviation and transportation industries. Particularly, such devices are most desirable for use in aircraft when high speeds, short braking distances, large inertia and human lives are involved. Consequently, most commercial and military aircraft are presently provided with anit-skid systems for guaranteeing that braking effort is, for any given situation, optimized. Such systems operate on the premise that the most effective braking effort is achieved by allowing the brake application to "hunt" about incipient skid conditions. When major skids occur, the brake pressure in most systems is completely dumped to allow the wheels to spin back up to runway speeds before reapplication of brake pressure under control of the anti-skid system.

Presently known systems generally provide so-called fail-safe means whereby control of braking is completely returned to the aircraft pilot in the event that the antiskid system causes brake pressure to be fully dumped for a period of time exceeding a preset limit (for example, two seconds) since such a condition is associated with system failure. In known systems, the reverting of the braking back to the pilot totally disarms the anti-skid system, and brake pressure from then on is totally under control of the pilot. Unfortunately, when the control of the braking effort is returned to the pilot, the degree of brake pedal depression by the pilot (which until then has been overridden by the antiskid system) represents nearly total brake force capacity for the vehicle. Skidding, blowouts, damaged tires and danger to human life is generally the result. Further, aquaplaning of the vehicle's wheels or other extremely adverse runway conditions may also result in the full-dump output of the anti-skid system being interpreted as a system failure. However, with present fail-safe devices the operation of the anti-skid systems, once removed, is not restored to the braking system even after the aquaplaning or adverse runway conditions are over.

Consequently, it is an object of the instant invention to present a failure warning and shut-off for anti-skid systems wherein there is not an instantaneous return of total braking to the pilot following either the adverse conditions mentioned above or anti-skid circuit failure.

Yet another object of the invention is to present a failure warning and shut-off for anti-skid systems wherein the anti-skid system, though released of operation during specific periods of adverse operation, may resume operation after satisfying certain conditions.

Still another object of the invention is to present a failure warning and shut-off for anti-skid systems wherein the overriding of the anti-skid system is, in such situations, carefully monitored and supplemented by a rudimentary anti-skid system.

Another object of the invention is to present a failure warning and shut-off for anti-skid systems wherein certain kinds of adverse operation of the anti-skid system may be rapidly negated without the subsequent inherent dangers of locked brakes, blown or damaged tires, or danger to human lives.

Yet another object of the invention is to present a failure warning and shut-off for anti-skid systems wherein the pilot is immediately informed of the shut-off of operation of the normal anti-skid system.

Still another object of the invention is to present a failure warning and shut-off for anti-skid systems which is reliable and accurate in operation, inexpensive to construct, easily adaptable for implementation with state of the art anti-skid systems, and readily constructed from available components.

These objects and other objects which will become apparent as the detailed description proceeds are achieved by: an improvement in a wheeled vehicle having anti-skid circuitry associated with the wheels thereof for producing anti-skid signals indicative of conditions of non-rotation of the wheels and for applying the anti-skid signals to anti-skid valves for the wheels, said improvement comprising: a comparator connected to the anti-skid circuitry and producing an output signal when the anti-skid signals exceed a particular level for a particular time duration; a pulse generator; and a switching circuit interconnected between said pulse generator and the anit-skid circuitry and controlled by said comparator to interconnect the anti-skid valves with the pulse generator upon receipt of said output signals and simultaneously disconnect the anti-skid circuitry from the anti-skid valves.

DESCRIPTION OF THE DRAWING

For a complete understanding of the objects and structure of the invention, reference should be had to the following detailed description and accompanying drawing wherein a preferred embodiment of the circuitry of the invention is shown in schematic form.

DETAILED DESCRIPTION OF THE PREFERRED EMBODIMENT

It will be understood that, although the invention herein is described for use on a vehicle having two wheels equipped with anti-skid systems, the teachings of the invention are equally applicable to a vehicle having any number of such wheels. However, it is known that the need of the invention is most critical for smaller aircraft such as those used in the military having only two or four wheels which are braked upon landing. On such vehicles, the failure of braking on a single wheel will result in a diminution of braking effort of from 25 percent to 50 percent and hence such condition is intolerable. However, on vehicles having, for example, eight wheels, it will be understood that the loss of braking effort on a single wheel diminishes the braking effort by only 12 percent and hence may be a tolerable situation not justifying the increased circuitry and cost of the invention. In any event, the teachings of the invention are equally applicable to any wheel-braked vehicle.

Referring now to the drawing, it can be seen that the failure warning and shut-off for anti-skid systems is designated generally by the numeral 10. An operational amplifier 12, utilized as a comparator, is provided with the negative input thereof connected to a voltage reference 15 which, for purposes of illustration, is set at 8 volts. The positive input of the amplifier 12 is connected through resistors 16–20 to a ground reference. A squat switch 22, as is well known in the art, in interconnected to the positive input of the amplifier 12 between the resistors 16, 18 for purposes of inhibiting the operation of the circuit 10 while the aircraft is in flight and the switch 22 is in the position shown in the drawing. Upon touchdown, when the switch 22 releases the node between the resistors 16, 18 from the ground reference, the circuit 10 becomes enabled. At such time, signals are provided from the anti-skid system 23 through diodes 24, 26 to the positive input of the amplifier 12. These anti-skid signals are also passed through the contacts of the relay 44 to the anti-skid valves 25 to provide anti-skid control for the brakes. The anti-skid system 23 is shown for a two-wheeled vehicle thus having two outputs, one for each wheel.

If either of the wheels of the aircraft starts into a non-rotational mode due to either skidding, aquaplaning or the like, the output of the anti-skid system 23 associated with that wheel go to a high voltage level. The voltage source 15 is set at a threshold level slightly below the high level output produced for non-rotational activity by the system 23 and thus, when such a situation occurs, the output of the amplifier 12 switches to a high state since the voltage on the positive input is greater than that on the negative input. Upon such occurrance, the capacitor 30 begins to charge through the resistor 28 and, if this charge reaches the threshold level determined by voltage source 35, the output of the operational amplifier 36 also changes state. However, should the dump signal from the anti-skid system 23 disappear before such charging of the capacitor 30 occurs, the output of the amplifier 12 will again revert to a low level and the capacitor 30 will instantaneously discharge through the diode 38. Consequently, the circuit comprising elements 28, 30 and 38 provides a timing circuit such that the output of the amplifier 36, connected as a comparator, will not switch unless a pressure-dump signal has been presented from the anti-skid system 23 for a fixed period of time. This time period is selected as a design criteria based upon the maximum length of time that a dump signal may exist before the anti-skid system 23 is deemed to have malfunctioned. When the capacitor 30 has charged to the level set by the voltage source 35, the positive level applied through the resistor 32 to the negative input of the amplifier 36 causes the output thereof to switch to a low level.

The output of the amplifier 36 is applied through the resistor 40 to the base of transistor 42. A relay 44 is interconnected between an energization source 45 and the collector of the transistor 42. During normal operation of the anti-skid system 23, the positive output of the amplifier 36 causes the transistor 42 to be in a conductive state and the contacts of the relay 44 are maintained in the position shown. A relay 70 is provided for control of a light. The relay is energized from the energization source 45 to indicate to the pilot that the system is operative. Upon receipt of a negative output from the amplifier 36, indicating that a dump signal has been present for an extraordinary length of time, the transistor 42 is gated off and the relay 44 deenergizes such that the contacts switch to the open positions which are opposite to those shown in the drawing. It can now be appreciated that the signals from the anti-skid system 23 are disconnected from the anti-skid valves 25 and the normal anti-skid system is rendered inoperative for controlling skids. Similarly, the light relay 70 is de-energized, which turns on the light to give a visual indication to the pilot.

With the de-energization and resultant switching of relay 44, a voltage from the source 47 is applied to the multivibrator circuit 48 to energize the same. This circuit is not unusual in the art and comprises an operational amplifier 50 having the output thereof fed back to the negative input through resistors 54, 56 and diode 58 and to the positive input through resistor 64. The negative input is also connected to the capacitor 52. As should be readily appreciated by those skilled in the art, the elements 52–58 determine the duty cycle and on-off ratio of the output of the multivibrator 48 since the diode 58 enables and inhibits flow of current through the resistor 56 on the positive and negative output cycles of the amplifier 50 respectively. By appropriately selecting positive and negative time constants via the values of the capacitor 52 and resistors 54, 56, the desired duty cycle may be easily achieved. Resistors 60–64 are interconnected as shown in the standard fashion for proper bias change of the positive input of the amplifier 50 to provide snap action of the switching of the amplifier and for elimination of jitter. As should be readily appreciated by those skilled in the art, the feedback resistor 64 functions for a hysteresis effect to affectuate a bias change on the positive input of the amplifier 50. This bias change, coupled with the operation of the elements 52–58, dictates the duty cycle of the multivibrator 48.

The output of the multivibrator 48 is supplied to the base of the transistor 66 which, due to the de-energizing of the relay 44, now feeds the anti-skid valves 25. The output signal from the transistor 66 (which is provided for purposes of achieving the proper drive) is generally of the nature shown at 68 wherein pulses 69 are provided above the ground level 71 of an amplitude equivalent to that of a full dump signal. This wave form 68 is thus applied to the anti-skid valves 25 to intermittantly provide full dump of brake pressure. It will of course be understood that when the anti-skid system 23 is switched from the anti-skid valves 25, braking control remains with the pilot. However, the wave form 68 supplied to the anti-skid valves overrides the pilot's efforts by providing intermittant dumping of brake pressure so as to operate as a rudimentary anti-skid system. Thus a panicky pilot or a pilot trying to control the braking of an aircraft on a runway of adverse conditions will still be provided with a source of anti-skid control while substantially maintaining braking efforts by himself. It should be appreciated that the signal 68 may vary with the type of aircraft and that the frequency thereof must be one other than the resonant frequency of the landing gear with which the circuit 10 is associated. It is, however, contemplated that the wave form 68 be of an approximate 25% duty cycle wherein the dump signals 69 are of a duration of approximately 0.10 seconds and are spaced apart by 0.30 seconds.

It should be readily appreciated that the pilot will become immediately aware of the failure of the normal anti-skid system and the application of the multivibrator 48 to the anti-skid valves 25, since the periodic dumping of brake pressure by the pulses 69 will have an effect on the aircraft which will be felt or sensed by the pilot. Thus, even if the pilot does not notice the turn-on of the light by the relay 70, he will become readily aware of the braking condition by virtue of a physical sensation realized through the aircraft.

It is a particular attribute of the invention that, should the output of the anti-skid system 23 return to normal operation such that the dump signal evidenced from one or both of the outputs drops below the threshold dictated by the source 15, the amplifiers 12, 36 will again switch states and the transistor 42 will again turn on thus switching the contacts of relay 44 back to the position shown in the drawing. Such operation inhibits the functioning of the multivibrator 48 and again reapplies the normal anti-skid signals to the anti-skid valves 25. Thus, once the anti-skid system has seemingly failed, it is not beyond the capabilities of the invention to return the braking of the aircraft to the normal anti-skid system once the anti-skid circuitry is again properly functioning.

It will, of course, be appreciated that polarities and particular voltage values selected for incorporation with the teachings of the invention may vary depending upon the particular anti-skid system with which the circuitry is to be associated. Consequently, any of numerous variations from the basic theme of the invention are claimed to be a part hereof and, while in accordance with the patent statutes, only the best mode and preferred embodiment of the invention has been presented and described in detail, the invention is not intended to be limited thereto or thereby. Consequently, for an appreciation of the true scope and breadth of the invention reference should be had to the following claims.

What is claimed is:

1. In a brake system for a wheeled vehicle having anti-skid circuitry associated with the wheels thereof for producing and applying anti-skid signals indicative of skidding activity of the wheels to anti-skid valves, the improvement comprising:
   first circuit means connected to the anti-skid circuitry for receiving the anti-skid signals and producing a first signal if the anti-skid signals exceed a predetermined level;
   second circuit means connected to said first circuit means and controlled by said first signal for inhibiting the application of the anti-skid signals to the anti-skid valves; and
   third circuit means connected to and controlled by said second circuit means for applying a pulsating signal to the anti-skid valves upon the inhibiting of the application of the anti-skid signals thereto.

2. The improvement according to claim 1 wherein said first circuit means includes timing circuit means for inhibiting said first signal until the anti-skid signals have exceeded said predetermined level for a fixed period of time.

3. The improvement according to claim 1 wherein said first circuit means comprises a comparator interconnected with a time delay circuit.

4. The improvement according to claim 1 wherein said second circuit means comprises an electromechanical relay.

5. The improvement according to claim 1 wherein said third circuit means comprises a multivibrator.

6. The improvement according to claim 5 wherein said multivibrator is energized by said second circuit means.

7. The improvement according to claim 1 which further includes means connected to said second circuit means for providing a visual indication that the application of the anti-skid signals to the anti-skid valves is inhibited.

8. In a wheeled vehicle having anti-skid circuitry associated with the wheels thereof for producing anti-skid signals indicative of conditions of non-rotation of the wheels and for applying the anti-skid signals to anti-skid valves for the wheels, the improvement comprising:
   a comparator connected to the anti-skid circuitry and producing an output signal when the anti-skid signals exceed a particular level;
   a pulse generator; and
   a switching circuit interconnected between said pulse generator and the anti-skid circuitry and controlled by said comparator to interconnect the anti-skid valves with the pulse generator upon receipt of said output signals and simultaneously disconnect the anti-skid circuitry from the anti-skid valves.

9. The improvement as recited in claim 8 which further includes a timing circuit connected to said comparator for inhibiting said output signal until the anti-skid signals have exceeded said particular level for a fixed period of time.

10. The improvement as recited in claim 8 wherein said pulse generator comprises a multivibrator.

11. The improvement as recited in claim 8 wherein said switching circuit includes a relay with the contacts thereof connected to the anti-skid circuitry and pulse generator.

12. The improvement as recited in claim 8 wherein said output signal from the comparator is removed when the anti-skid signals drop below said particular level and such removal controls said switching circuit to disconnect the anti-skid valves from the pulse generator and reconnect the anti-skid circuitry to the anti-skid valves.

* * * * *